(12) United States Patent
Schmitt et al.

(10) Patent No.: US 11,653,663 B2
(45) Date of Patent: May 23, 2023

(54) PLANT-PROTEIN BASED TEXTURIZED OIL-IN-WATER EMULSIONS

(71) Applicant: SOCIETE DES PRODUITS NESTLE S.A., Vevey (CH)

(72) Inventors: Christophe Joseph Etienne Schmitt, Servion (CH); Maxime Saffon, Hilliard, OH (US); Johann Buczkowski, Corcelles-le-Jorat (CH); Luca Amagliani, Lausanne (CH); Oscar Francisco Castellani, Nantes (FR); Elyes Ben Sassi, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 341 days.

(21) Appl. No.: 16/770,798

(22) PCT Filed: Dec. 4, 2018

(86) PCT No.: PCT/EP2018/083415
§ 371 (c)(1),
(2) Date: Jun. 8, 2020

(87) PCT Pub. No.: WO2019/115280
PCT Pub. Date: Jun. 20, 2019

(65) Prior Publication Data
US 2021/0177000 A1 Jun. 17, 2021

Related U.S. Application Data

(60) Provisional application No. 62/597,119, filed on Dec. 11, 2017.

(51) Int. Cl.
*A23D 7/04* (2006.01)
*A23D 7/005* (2006.01)
*A23J 3/14* (2006.01)
*A23J 3/16* (2006.01)
*A23L 2/66* (2006.01)

(52) U.S. Cl.
CPC ............ *A23D 7/0053* (2013.01); *A23D 7/04* (2013.01); *A23J 3/14* (2013.01); *A23J 3/16* (2013.01); *A23L 2/66* (2013.01); *A23V 2002/00* (2013.01)

(58) Field of Classification Search
CPC .......... A23V 2200/124; A23V 2300/24; A23V 2250/5488; A23V 2200/222; A23J 3/16; A23J 3/14; A23J 3/00; A23J 3/346; A23J 1/006; A23J 1/14; A23J 3/22; A23L 35/10; A23L 2/66; A23D 7/0053; A23D 7/04

See application file for complete search history.

(56) References Cited

U.S. PATENT DOCUMENTS

2010/0119682 A1   5/2010   Ye
2013/0129900 A1   5/2013   Sridhar et al.

FOREIGN PATENT DOCUMENTS

| CN | 101052308 A | 10/2007 | |
| CN | 102238875 A | 11/2011 | |
| EP | 1201134 | 5/2002 | |
| JP | H08505287 A | * 6/1996 | ............... A23L 9/24 |
| NZ | 554743 A | 12/2009 | |
| WO | 2006048426 A1 | 5/2006 | |
| WO | 2018220188 A1 | 12/2018 | |

OTHER PUBLICATIONS

JP H08505287 A, Machine English Translation, Jun. 11, 1996 pp. 1-4 (Year: 1996).*
Chile Office Action for Patent Appl No. 202001058 dated Jun. 8, 2021.
Chen et al. "Thermal aggregation and gelation of soy globulin at neutral pH" Food Hydrocolloids, 2016, vol. 61, pp. 740-746.
Franco et al. "Influence of pH and protein thermal treatment on the rheology of pea protein-stabilized oil-in-water emulsions" Journal of the American Oil Chemists' Society, 2000, vol. 77, No. 9, pp. 975-984.
Chen et al. "Structure of self-assembled native soy globulin in aqueous solution as a function of the concentration and the pH" Food Hydrocolloids, 2015, vol. 56, pp. 417-424.

* cited by examiner

*Primary Examiner* — Hong T Yoo
(74) *Attorney, Agent, or Firm* — K&L Gates LLP

(57) ABSTRACT

The invention relates to a method of producing a plant-based oil-in-water emulsion comprising the steps of providing an ingredient composition which is free from dairy protein, said composition comprising 1.5 to 5 wt. %, preferably 2 to 5 wt. % proteins, wherein the protein consist of plant protein only, 0.5 to 10.5 wt %, preferably 1.5 to 7.5 wt % of oil, and having a pH of 5.3-6.7, preferably 5.6-6.6, optionally adding divalent cations to provide a concentration of 1-5 mM free divalent cations in the ingredient composition, optionally adding monovalent cations to provide a concentration of 1-20 mM free monovalent cations in the ingredient composition and homogenizing and subsequently heat treating the ingredient composition to a temperature of 80°-100° C. for a period of 0.5-15 min or an ultra high temperature (UHT) heat treatment above 135° C. for 3 to 30 s to form agglomerated proteins comprising plant proteins and oil, and shearing the composition during or after the heat treatment to reduce the size of the agglomerated proteins, the agglomerates having a size of 5 to 50 microns as measured by D(4,3) mean diameter as measured by laser diffraction after the shearing. The invention also relates to a plant-based oil-in-water emulsion obtained by the method, and a use of the plant-based oil-in-water emulsion for the use in food and beverage products.

15 Claims, 10 Drawing Sheets

PLANT-PROTEIN BASED TEXTURIZED OIL-IN-WATER EMULSIONS

CROSS REFERENCE TO RELATED APPLICATIONS

The present application is a National Stage of International Application No. PCT/EP2018/083415, filed on Dec. 4, 2018, which claims priority to U.S. Provisional Patent Application No. 62/597,119, filed on Dec. 11, 2017, the entire contents of which are being incorporated herein by reference

FIELD OF THE INVENTION

The present invention relates to a method of producing a food or beverage product, in particular to a method for forming agglomerated proteins in an ingredient composition being an oil-in-water emulsion. The invention also relates food or beverage product comprising agglomerated plant proteins.

BACKGROUND

It is known that texture and mouthfeel can be provided to food and beverage products by protein agglomeration and there continue to be a need for food and beverages products exhibiting nutritional balance of macronutrients while delivering great taste and texture.

US2013/0129900 discloses the production of non-dairy protein beverage products based on soy. It is describing that heat treatment of soy proteins-based products at specific pH between 5.8-6.3 can improve the sensory properties of liquid beverages by production of agglomerated particles. However, the presence of particles with diameter >45 and <300 µm is likely to lead to product instability during shelf-life (sedimentation) and create some sandiness upon consumption.

N. Chen et al. [Thermal aggregation and gelation of soy globulin at neutral pH. 2016, Food Hydrocolloids, 61, 740-746] discloses that soy protein isolate was forming fractal aggregates upon heating at neutral pH at temperatures ranging between 50 and 90° C. for protein concentrations ranging between 5 and 9 wt %. In another paper by N. Chen, it was shown that soy globulin aggregates with a fractal dimension of 1.8 were formed between pH 5.8 and 7.0 at concentration between 0.1 to 10 wt % in the absence of heat [N. Chen et al. Structure of self-assembled native soy globulin in aqueous solution as a function of the concentration and the pH. 2016, Food Hydrocolloids, 56, 417-424]

J. M. Franco et al. [Influence of pH and protein thermal treatment on the rheology of pea protein-stabilized oil-in-water emulsions. 2000, JAOCS, 77, 9, 975-984] disclosed that a concentrated 65 wt % sunflower emulsion stabilized by 6 wt % pea protein was exhibiting a viscosity increase upon heating at temperature above 70° C. for up to 60 min and that the highest viscosity increase was obtained at pH around the isoelectrical point of the pea proteins, i.e. pH 5.3.

The prior art teaching shows that although viscosity increase may be obtained with soy and pea proteins, it is not disclosed for viscosity increase of other plant proteins.

Thus, there is a need for food and beverages products containing plant proteins exhibiting nutritional balance of macronutrients while delivering great taste and texture.

OBJECT OF THE INVENTION

It is thus the object of present invention to provide a food or beverage product based on plant proteins with improved texture and mouthfeel. It is a further object of the invention to improve the shelf life of the product(s).

SUMMARY OF THE INVENTION

The present invention provides the improvement by the use of plant protein-based agglomerates by specific heat treatment and pH adjustment in the presence of a specific shearing treatment that is performed during or after the heat treatment.

In a first aspect, the invention relates a method of producing a plant-based oil-in-water emulsion comprising the steps of providing an ingredient composition which is free from dairy protein, said composition comprising
1.5 to 5 wt. %, preferably 2 to 5 wt. % proteins, wherein the protein consist of plant protein only,
0.5 to 10.5 wt %, preferably 1.5 to 7.5 wt % of oil, and having a pH of 5.3-6.7, preferably 5.6-6.6,
optionally adding divalent cations to provide a concentration of 1-5 mM free divalent cations in the ingredient composition,
optionally adding monovalent cations to provide a concentration of 1-20 mM free monovalent cations in the ingredient composition
and homogenizing and subsequently
heat treating the ingredient composition to a temperature of 80°-100° C. for a period of 0.5-15 min or an ultra high temperature (UHT) heat treatment above 135° C. for 3 to 30 s to form agglomerated proteins comprising plant proteins and oil, and
shearing the composition during or after the heat treatment to reduce the size of the agglomerated proteins, the agglomerates having a size of 5 to 50 microns as measured by D(4,3) mean diameter as measured by laser diffraction after the shearing.

It has surprisingly been found that the effect of additional shearing on the plant protein agglomerates, their size may be reduced while a beneficial viscosity maintained. Although it is well known that gelling effect may be undesirable in food production, it has been found that performing heat treatment in combination with shearing it is possible to do this without losing the viscosifying and creaminess attributes in the product which is critical for the product texture. This is indeed surprising since shearing dairy protein agglomerates has been found to substantially reduce the viscosity of the product. Furthermore, it has the method according to the invention has been found to prevent product instability during shelf-life (sedimentation) and avoid the creation of sandiness of the product upon consumption.

The present invention uses plant protein-based aggregates that are generated upon heat treatment in order deliver optimum sensorial properties while allowing a reduction of the total fat content in the product. In addition, the described invention enables formulation of non-dairy texturized products without the use of additional stabilizers or hydrocolloids.

In a second aspect the invention relates plant and oil based oil-in-water emulsion obtained by a method described above.

In a further aspect the invention relates to the use of the oil-in-water emulsion used in food or beverage products. In particular a use for producing ready-to-drink (RTD) beverages, culinary sauces, coffee mixes, tea creamers, ice cream or cocoa-malt beverages.

DETAILED DESCRIPTION OF THE INVENTION

Figure 1:
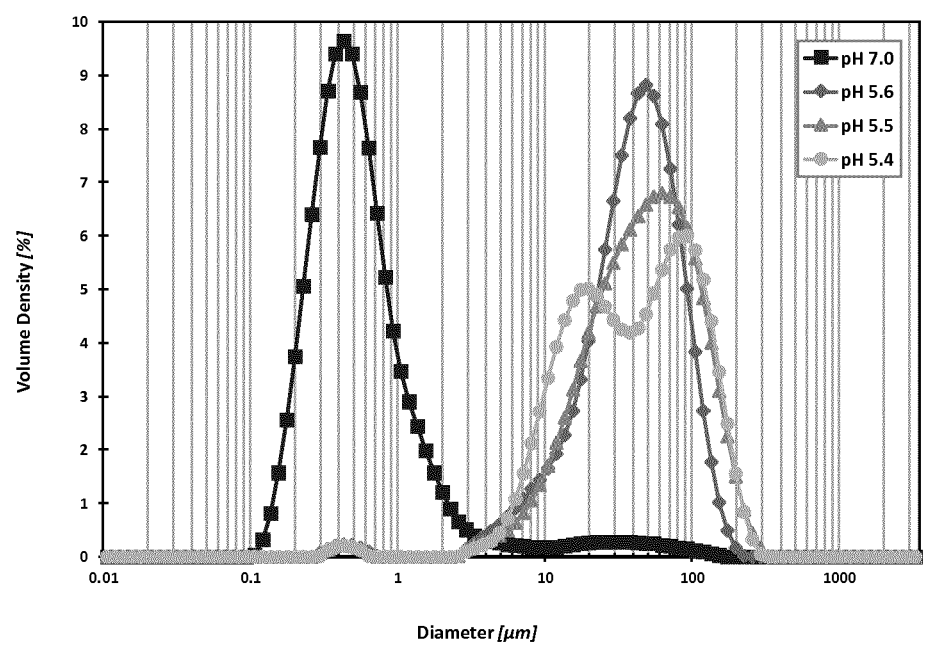
FIG. 1 shows particle size distributions of texturized high oleic sunflower based emulsions stabilized by commercial soy protein isolate at a total protein content of 2 wt % and after heating (80° C., 15 min) and shearing at pH 7.0, 5.6, 5.5 and 5.4.

When carrying out experiments on the effect of pH, to plant protein based oil-in-water emulsions on protein agglomeration and viscosity built up, it was surprisingly found that there is a critical range of pH leading to optimum protein agglomeration without precipitation or gelation of the formed aggregates upon heating. When this optimum pH is passed, the system either exhibited over-agglomeration with precipitation or a decrease of agglomerate size.

Without being bound to theory, it is likely that pH change is leading to an exchange between the protons adsorbed at the surface of the proteins and the protons provided by the acid used to adjust pH. This phenomenon resulted in a decrease of the pH of the dispersion and thereby a decrease of electrostatic repulsions between proteins. In these conditions, subsequent heat treatment of plant protein based emulsions is leading to a controlled aggregation of the proteins which was shown to affect positively the textural and sensorial properties of the finished products.

A major advantage of this invention is that it allows to texturize reduced fat plant protein based systems and enables a reduction of the use of additional hydrocolloids.

In the present context the agglomerates created with the method according to the invention and present in the product of the invention have a size of 5 to 50 microns as measured by D(4,3) or Dv50 mean diameter. The agglomerate particle size distribution is measured (PSD) using Mastersizer 3000 (Malvern Instruments, UK) or an equivalent measurement system. For the measurements a sample may e.g. be dispersed in the Hydro SM measuring cell until an obscuration rate of 9-10% is obtained and then analysed in the Mastersizer.

Further in the present context the free divalent cations may be measured by means of a selective electrode. For example, free (ionic) calcium concentration is determined a Mettler Toledo calcium selective electrode Perfection™ DX series half cells with BNC connector P/N 51344703 connected to a 692 pH/Ion meter (Metrohm Switzerland).

In the present context unless otherwise indicated % of a component means the % of weight based on the weight of the composition, i.e. weight/weight %.

In a preferred embodiment of the invention the agglomerates are 1-50 microns, preferably 5-50 microns measured by D(4,3) or Dv50 mean diameter. This give a desirable mouth feel to the product without the agglomerates providing grittiness.

In the present context plant protein may be selected from the group consisting of leguminous proteins, tuber proteins, oil seed proteins, cereal proteins or green leaves proteins or a combination thereof.

In a preferred embodiment of the invention the plant protein is selected from the group consisting of pea protein, soy protein, potato protein, canola protein or RuBisco protein extracted from green leaves or a combination thereof.

When the proteins are cereal it may preferably be rice, brown rice, rice bran, corn, wheat, oat, or a combination thereof.

When the proteins are leguminous the proteins are selected from the group consisting of yellow pea, green pea, faba bean, soybean, lupin, lentil, or a combination thereof.

Advantageously, the leguminous protein is treated with a technique selected from the group consisting of: extracted using isoelectric precipitation, enzymatic processes such as starch hydrolysis via alpha amylase, air classification, or a combination thereof.

Alternatively, the plant protein is an edible nut in the form of a paste or a powder. Preferred edible nut comprises hazelnut, walnut, almond, cashew, peanut, chestnut, pistachios, macadamia, pecan and combinations thereof.

In the method according to the invention the oil may be vegetable oils selected from the group consisting of coconut oil, high oleic canola, high oleic soybean oil, high oleic sunflower, high oleic safflower, or a combination thereof.

The pH of the ingredient composition may advantageously be been adapted by addition of an acid selected form the group consisting of: vegetable lactic acid, glucono-delta-lactone, phosphoric acid, ascorbic acid, acetic acid, citric acid, malic acid, hydrochloric acid, or a combination thereof.

According to the method of the invention the ingredient composition is subjected to high pressure homogenization providing high-shear or high-shear mixing treatment. It has surprisingly been found that the agglomerates created in the method according to the invention are not destroyed if agglomerates are subjected to too high shear. The shearing is during or after the heat treatment of the ingredient composition.

It is also preferred that the shearing is done until the ingredient composition has a viscosity at 10 s-1 and 20° C.

is 1-900 mPa·s, preferably 2-100 mPa·s in order to remain pumpable and liquid upon consumption.

In a preferred embodiment of the method of the invention, the shearing of the agglomerates is done by means of a rotor/stator shearing, preferably operating at least at 10.000 rpm for minimum 1 min. More preferably the rotor/stator shearing is operated at least 10.000 rpm for minimum 1 min for a volume of 100 ml.

In another preferred embodiment of the method of the invention, the shearing of the agglomerates is done by means of a high pressure homogenizer, preferably at a pressure 120-320 bars, more preferably 200 to 320 bars.

When divalent cations are add in to the ingredient mix in the process according to the invention it is preferred that the divalent cations are selected from the group consisting of Ca or Mg cations or a combination thereof. These divalent cations are food grade and do not contribute for easy oxidation of oils or fats.

In a preferred embodiment of the invention the divalent cations are calcium cations.

Advantageously, the divalent cations are added to until the free divalent cations concentration is 3.5-5.0 mM.

Furthermore, it is preferred that the divalent cations are added in form of a mineral salt. Preferably the mineral salt is calcium salt is selected from to the group consisting of calcium chloride, calcium hydroxide, calcium carbonate, calcium citrate, calcium phosphate, stearate malate, calcium glycerophosphate, calcium lactate, and calcium gluconate. In a particular preferred embodiment of the invention the calcium salt is calcium chloride or calcium lactate.

Plant proteins are preferably selected from powdered plant protein concentrates or isolates.

The invention also relates to a non-dairy concentrate obtained by the above described method.

In a particular preferred embodiment of the invention the concentrate is dried into powder by means of freeze drying, spray drying or roller-drying.

It was surprisingly found that the addition of divalent cations and the process conditions of the present invention form agglomerates with the casein micelles, which results in increased colloidal particle size, water binding and overall viscosity. Surprisingly the structure and function after drying the composition is maintained. It was observed that current high pressure spray drying conditions for standard milk powder manufacture resulted in high shear effect that destroyed the controlled agglomeration of proteins and thus the functionality during spray drying process.

Several types of atomization are known for spray drying such as centrifugal wheel, hydraulic (high) pressure-nozzle, pneumatic (two phase nozzle) and sonic atomization. The term "low pressure drying system" refers to centrifugal wheel or pneumatic atomization systems which protects the structure of the plant protein agglomerates. It has been observed that high pressure atomizers such as hydraulic (high) pressure-nozzle atomization results in too high shearing effect thus destroying the plant-protein agglomerates and thus its unique functionality. Such high pressure atomizers are useful for making conventional milk powders; however such a high-pressure system is not suitable for producing samples of the present invention. It has however been found that spray drying using low pressure drying system preserves the functionality of the product. The low pressure nozzles may operate below 100 bars, more preferred below 50 bars, preferably below 20 bars.

Products according to the invention may be non-dairy based products such as ice cream or frozen confectionery, non-dairy concentrates or desserts, sauces etc. The product format includes frozen, ambient, liquid and powder.

In a preferred embodiment a product according to the invention comprises sugar comprising sucrose, glucose, fructose and/or combinations ranging from 0-15 wt/wt % of the creamer composition. The product may also further comprise a natural sweetener in an amount of about 0.0003 to about 10% by wt/wt % of the product. A preferred product according to the invention is a plant-based Ready-To-Drink beverage with the above-mentioned sugar content.

EXAMPLES

By way of example and not limitation, the following examples are illustrative of various embodiments of the present invention.

Example 1: Determination of Optimum pH for Obtaining Plant Protein Texturized 2.5 to 10 wt % High Oleic Sunflower Oil Emulsions Stabilized by 2 wt % Proteins Material and Methods Two commercial isolates of soy and pea protein were used. The soy protein isolate was Profam 974 IP from ADM (Decatur, Ill., USA) and pea protein isolate was Nutralys 85SF from Roquette Frères (Lestrem, France). The protein content in the isolates was determined by the Kjeldahl method (Nx6.25) and was 90% (on wet powder) for soy and 78% (on wet powder) for pea.

In addition, isolated globulin fractions of soy and pea were produced upon extraction from defatted flours.

Pre-Treatment of Defatted Soy

Defatted soy flour 7B IP (51% protein on wet basis) was obtained from ADM (Decatur, Ill., USA). The flour was treated during 90 minutes (gentle stirring), using distilled water (Milli-Q quality) and pH was adjusted to 7.5. The flour:water ratio was 1:15 (i.e. 900 g of water for 60 g of flour). In order to separate the residual flour from the liquid extract, a centrifugation at 9000×g during 30 min was applied (20° C.). Insoluble fraction (residual flour)+supernatant (protein extract) were collected. The sodium bisulphite (final concentration of 0.98 g·L$^{-1}$) was added to the supernatant (protein extract). Following, the pH value was adjusted to 6.4 using HCl 2.0 N. The pH was controlled regularly and adjusted when needed and solution was kept overnight at 4° C. The solution (at pH 6.4) was then centrifuged at 6500×g for 20 min at 4° C. Both fractions were separated and processed as follow. The precipitate was mainly composed by glycinin (11S globulin fraction of soy). It was re-suspended in distilled water (Milli-Q quality), and the pH value adjusted to 7.5. This precipitated fraction was then freeze-dried. The supernatant contained a globulin protein mixture, with residual 11S globulin and conglycinin (7S globulin fraction). Solid NaCl was added to this supernatant at a final level of 0.25 mole·L$^{-1}$, and the pH set at 5.0 (HCl 2 N) during 1 hour. The supernatant solution (with added NaCl) was submitted to centrifugation at 6500×g for 20 min at 4° C. Again, the precipitate was re-suspended in distilled water (Milli-Q quality), and pH was adjusted to 7.5 before freeze drying. This fraction, not used indeed for functional properties tests, is a mixture of 11S and 7S fractions. The supernatant was further diluted 2-fold (in volume) with cold (4° C.) distilled water (Milli-Q quality) and the pH was set to 4.8 during at least 10 min. Thereafter, the supernatant fraction (at pH 4.8, sample 4b) was centrifuged again at 6500×g for 20 min at 4° C. The precipitate was washed once with distilled water (Milli-Q quality), and then it was re-suspended in water and pH adjusted to 7.5. Freeze-dried sample contained 7S globulin fraction. The supernatant, containing albumin and 7S globulin fraction, was set to pH 7.5 and then freeze-dried. The protein content of the two 11S and 7S fractions was analysed by Kjeldahl analysis and was >90% (wet basis).

Pre-Treatment of Pea

For pea protein extraction, pea flour (23% protein on wet basis) was obtained from Roquette Frères (Lestrem, France). Proteins were extracted from flour during 1 hour with gentle magnetic stirring. Ratio between flour and extracting solvent ($Na_2HPO_4$ 0.1 M+$K_2SO_4$ 5% (w/v) at pH 7.2) was 1:10. The extraction was applied three times successively to the same flour, and the three batches were pooled together (600 mL for 20 g of flour processed). Then flour was separated from extracting solution by centrifugation at 9000×g during 20 min (20° C.). The insoluble fraction (residual flour) was freeze-dried. The supernatant fractions (protein fraction containing globulins and albumins) were pooled and submitted to dialysis against MilliQ water. Dialysis time was between 48 and 72 h, at 4° C. using a membrane dialysis cut off of 6000 Da and a ratio of 1:30 (extracting solution:water). Dialyses was stopped when conductivity value of outside water solution was stable. Then the dialyzed solution was centrifuged at 9000×g pendant 30 minutes at 20° C. The soluble fraction, corresponding to the albumins (2S), was then freeze-dried. The insoluble material, containing mainly the globulin fractions (7S and 11S globulins), was freeze-dried. The protein content in the freeze-dried pea 11S and 7S fractions was >90% (wet basis).

Preparation of Green Leaf Protein

Finally, purified extracts from green leaves protein, Rubisco, were prepared from sugar beet leaves at lab and pilot scale.

At lab scale, Fresh sugar beet leaves (15.2 kg) without stems were pressed using an Angel Juicer (Slowjuice, Naarden, The Netherlands). The juice was collected into a container and mixed with sodium metabisulphite and $CaCl_2.2H_2O$ to a final concentration of 0.2% w/v and 200 mM respectively. The pH was set at 6.8 using 1 M sodium hydroxide. During collection, the juice was stirred, cooled in ice water, and stored at 4° C. until further use. To remove the chlorophyll, 12 L of the collected juice was heated to 50° C. in 2 min using a heat exchanger (SWEP, Sweden). Subsequently, the juice was kept at 50° C. for 15 min and cooled to 20° C. in 2 min using the same heat exchanger. The cooled juice was centrifuged (17,000×g, 45 min, 7° C.) using a Sorval Lynx superspeed centrifuge (Thermo Scientific, USA), and the supernatant (10.4 L) was subsequently concentrated by ultrafiltration (100 kDa cut-off, regenerated cellulose, Hydrosart (Sartorius, Germany)) to 1 L. The concentrated solution was diafiltered against 10 L of 0.2% w/v sodium metabisulphite to remove small proteins, polyphenols and inorganic compounds, and subsequently diafiltered with 20 L demineralized water to remove metabisulphite and other salts. The final 1 L of RuBisCO protein isolate (RPI) was freeze-dried, leading to about 50 g of Rubisco protein powder with a protein content >86% (wet basis, Nx6.25).

The same extraction process was applied at pilot scale, starting with a 1500 kg batch of fresh sugar beet leaves. An amount of 750 g of freeze-dried Rubisco protein powder with a protein content of 72% (Nx6.25) was obtained.

Preparation of Protein Dispersions

The stock dispersion of individual plant proteins (commercial soy, pea, lab extracted soy 7S and 11S, lab extracted pea 7S/11S and Rubisco lab and pilot extracted) was prepared at a protein concentration of 2 wt %. Protein powder were dispersed in MilliQ water for 4 hours at room temperature under stirring. The dispersions were then stored overnight at 4° C. to allow the complete hydration and decrease the foam layer that formed during stirring.

Emulsion Preparation

O/W emulsions were prepared by the addition of high oleic sunflower oil (Oleificio Sabo, Manno, Switzerland) to the proteins dispersions so that total sample resulted in oil content ranging between 2.5 and 10 wt % and a constant protein content of 2 wt %. The oil/water systems were subsequently pre-homogenized using an Ultra-Turrax T25 basic (IKA®, Switzerland) at 11,000 rpm/min during 1 minute for a volume of 500 mL. The pre-homogenized emulsions were afterwards homogenized at High Pressure with a PandaPLUS HomoGenius 2000 (GEA®, Germany) adjusted at 50 bars for the first valve and at 250 bars for the second one, to obtain a pressure total of 300 bars.

After homogenization, pH was adjusted in the range 5.0-7.0 by addition of 1M HCl. The heat treatment was performed in order to denature the proteins and enable agglomeration. Emulsions and dispersions prepared as described above were heated at 80° C. for 15 min under magnetic stirring using a microwave Discover Explorer (CEM Corporation, USA). Six CEM glass-tubes containing around 25 g of dispersion/emulsion were heated for each condition tested (see Table 1). After cooling down to room temperature, pictures of the heated samples were taken to observe the macroscopic structure of the heated samples.

The samples were the sheared at 11,000 rpm for 1 min in CEM tubes using an Ultra-Turrax T25 basic (IKA®, Switzerland) and a smaller rod (S25N-10G) following heat treatment. Finally, formulations were stored at 4° C. until the analysis on heated samples were performed.

Particle Size Distribution

In order to assess particles size distribution, emulsions were analyzed after shearing by dynamic light scattering using a MasterSizer 3000 (Malvern Instruments Ltd®, UK). The emulsion sample was dispersed in the Hydro SM measuring cell until an obscuration rate of 9-10% was obtained. Non-heated and heated samples were analyzed. Measures were performed three times and the average of the three replications was reported.

Flow Properties

One day after shearing, flow experiments were performed using a controlled stress rheometer Physica MCR501 (Anton Paar®, Austria) with concentric cylinders geometry CC27-SS/S (diameter=27 mm, gap=1.14 mm by Anton Paar®, Austria).

Steady state flow measurements were conducted in a constant temperature of 25° C., a shear stress of 100 l/s was applied to the samples during 5 min, following by four shear rates, one from 0.1 to 500 l/s and one other from 500 to 0.1 l/s, these were done twice; 15 measurements each 30 s were done. The apparent viscosity was recorded as a function of the shear rate.

For each measurement, an aliquot (19 mL) of the emulsion sample was poured into the cup. Measures were performed three times and the average of the three replications was reported.

Results

FIG. 1 is showing the particle size distribution of texturized 2.5 wt % oil-in-water emulsion that is based on 2 wt % commercial soy protein isolate. It can be seen that at pH 7.0, the particle size is centred around 0.5 micron because soy proteins do not agglomerates. However, when the pH is decreased, the agglomerates with large sizes are detected. Interestingly, systems at pH 5.4 and 5.5 exhibited bimodal size distribution as well particles larger than 50 microns in diameter. This was leading to sedimentation over time. In this case, the optimum pH for texturizing the emulsion was 5.6.

Figure 2:
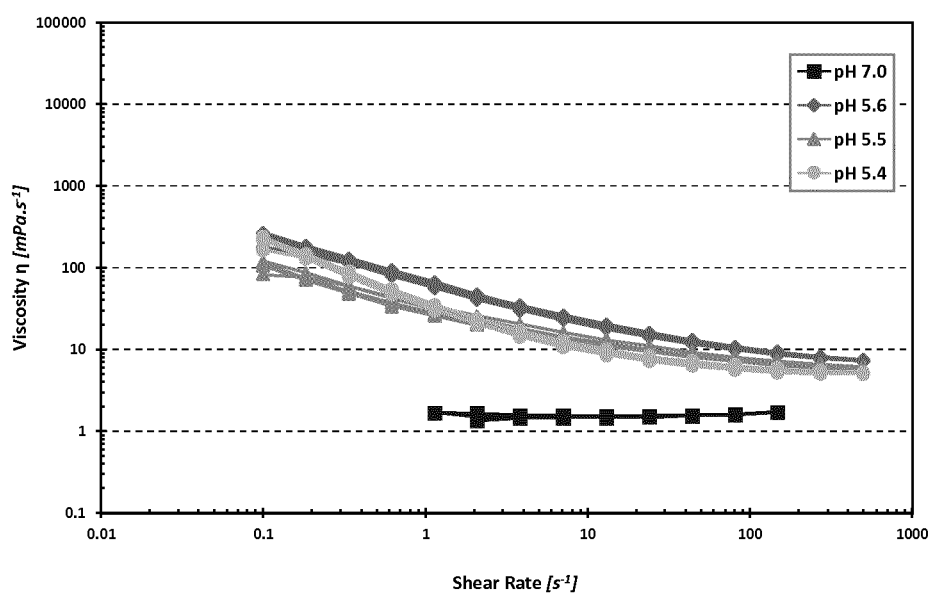
FIG. 2 shows flow curves at 20° C. for 2 wt % soy protein isolate texturized high oleic sunflower emulsion after heat treatment and shearing at 80° C. for 15 min at pH 7.0, 5.6, 5.5 and 5.4.

FIG. 2 is showing the corresponding flow curves of the texturized emulsions. It can be seen that for systems where agglomerates have been produced, pH 5.4-5.6, the viscosity is higher than at pH 7.0 where no agglomerates have been formed. The highest shear thinning behaviour was obtained for the pH 5.6, indicating that this emulsion had the highest texture.

Table 1 is summarizing the optimal conditions of pH to obtained texturized emulsions with 10 wt % sunflower oil with different plant protein sources. Interestingly, the optimum pH for the commercial soy protein isolate was intermediate between that of the two 7S and 11S fractions which are composing it. For pea, the commercial isolate had similar optimum pH than the extracted 7S/11S mixture. The Rubisco protein isolate exhibited different optimum pH depending on the extraction scale but the viscosity exhibited by the emulsion was the highest among all protein sources indicating the high gelling properties of that protein source. Interestingly, the protein agglomerate size D(4,3) was lower than 50 microns for all the tested proteins and no sign of instability upon storage was noticed at optimum pH.

TABLE 1

Optimum pH conditions to obtain texturied 10 wt % emulsions stabilized by 2 wt % protein after shearing at 11,000 rpm after heat at 80° C. for 15 min.

| Protein source | Optimal pH condition (80° C., 15 min) | D(4,3) diameter (micron) | Viscosity at 10 s$^{-1}$ for 10 wt % emulsion (mPa · s) |
| --- | --- | --- | --- |
| Commercial soy protein isolate | 5.6 | 140 | 32.8 |
| 11S soy globulin protein | 6.0 | 25 | 9.2 |
| 7S soy globulin protein | 5.3 | 70 | 15.8 |
| Commercial pea protein isolate | 5.8 | 54 | 15.9 |
| 7S/11S pea globulin protein | 5.8 | 21 | 14.4 |
| Lab scale produced sugar beet Rubisco protein | 6.0 | 900 | 22.1 |
| Pilot scale produced sugar beet Rubisco protein | 5.4 | 750 | 38.4 |

Example 2: Production of Plant Based Agglomerates in Similar Processing Conditions at pH 6.6 Using Soy, Pea and Potato Proteins in Presence of Added NaCl and CaCl$_2$ Material and Methods Potato protein isolate (Solanic 200) was purchased from Solanic B.V. (Veendam, The Netherlands).

Soy Protein Preparation

Soy protein isolate was produced as follows using mild isoelectric precipitation process to minimize protein denaturation. This isolate was prepared from defatted soy protein flour 7B purchased from ADM (Decatur, Ill., USA). A wt % soy protein flour slurry was prepared at 4° C. by dispersing 25 kg of soy flour in 225 kg of demineralized water into a 600 L stainless steel tank equipped with an impeller stirring at moderate speed in order to prevent foam formation. After overnight stirring, the dispersion was brought to 10° C. and the initial pH was found to be 6.90. The required amount of 4N sodium hydroxide was added in order to raise the pH to 7.5. The dispersion was then centrifuged at 4° C. using a continuous CSC6 separator (GEA, Westfalia Separator GmbH, Oelde, Germany) operating at 12,000 rpm (10,000 g) and a flow rate of 60 L·h-1. The plates of the separator were cleaned every 300 s with continuous water flush and the counter pressure in the centrifuge was set at 2 bars. The supernatant obtained exhibited a total solids content of 7.4 wt % and was recovered in a 250 L stirred stainless steel tank at 4° C. The temperature was then raised to 8° C. and 4N hydrochloric acid was added to the dispersion to reach a final pH of 4.8. The obtained dispersion was centrifuged at 900 rpm (6,500 g) at a flow rate of 70 L·h-1 with a water flush every 200 s to prevent excessive precipitation of the protein fractions. An amount of 80 kg of precipitate was recovered in a 200 L stirred tank at 4° C. The total solids were about 26 wt %. Finally, soy protein dispersion was diluted to 13 wt % solids by addition of 80 kg of demineralized water and the pH was raised back to 7.0 by addition of 4N NaOH. The neutralized protein dispersion was then transferred into sealed 2 L aluminium pouches and frozen at −50° C. Frozen pouches were then open and freeze dried using a Telstar LyoBeta 35 freeze drier (Swiss Vacuum Technologies SA, Marin-Epagnier, Switzerland). The protein content in the freeze-dried powder was determined to be 85.4% (g/100 g wet powder; Kjeldhal, Nx6.25). SDS-PAGE analysis of the freeze dried protein isolate revealed that the product was mainly composed by 7S and 11S fractions from soy.

Pea Protein Preparation

For pea protein isolate preparation, the same procedure as above was repeated except that the initial 10 wt % slurry was prepared by dispersing 50 kg of pea flour into 450 kg of demineralized water. After centrifugation at pH 7.5 and 4.8, the total amount of precipitate was 57 kg with a total solid of 15 wt %. It was then freeze dried as above and the protein content in the freeze dried powder was 84.8% (g/100 g of wet powder; Kjeldhal, Nx6.25).

Total nitrogen of the protein powders was determined by the Kjeldahl method according to AOAC (2005). Nitrogen-protein conversion factor of 6.25 was used to calculate total protein content of plant-based protein powders and a factor of 6.38 was used for whey protein powder.

Protein Dispersions

Protein stock solutions (1200 g) were initially prepared by dispersing the protein powders in MilliQ water (5 wt % protein) for 2-3 hours under slow stirring at room temperature. For each protein tested, two protein stock solutions were prepared, i.e. one for the samples containing salt and one for the salt-free samples. Each stock solution was then split into three sub-solutions of 300 g each. As regards the samples containing salt, 0.95 wt % NaCl (Emsure®, Denmark) and 0.10 wt % CaCl$_2$ (CaCl$_2$,2H$_2$O, Sigma-Aldrich, USA) were added to each sub-solution, whereas no salt was added to the salt-free samples. The pH of the sub-solutions was adjusted to 6.6 using 1N HCl and/or NaOH as required.

High oleic sunflower oil was then added at 2.5 wt % to the respective protein dispersions. Finally, MilliQ water was added to each dispersion until reaching a protein concentration of 3 wt % for a final volume of 500 g.

Emulsion Preparation

The protein dispersions prepared above were pre-homogenized with an Ultra-Turrax T-25 basic (IKA®, Switzerland) at a speed of 11 000 rpm for 1 minute in a plastic beaker. The pre-homogenized mixtures were homogenized using a PandaPLUS HomoGenius 2000 (GEA®, Germany), with first and second stage pressures of 50 and 250 bars, respectively. Formulations went through the homogenizer twice in order to ensure homogenization of the whole sample, and were then collected in a glass flask. After this step, pH of the homogenized samples was readjusted to 6.6 using 1N HCl and/or NaOH as required and pictures of the homogenized protein-based dispersions and the emulsions were taken after cooling. One portion of these homogenized protein-based dispersions and emulsions was then heat treated.

Heat Treatment

The heat treatment was performed in order to denature the proteins and enable aggregation. Emulsions and dispersions prepared as described above were heated at 95° C. for 90 seconds under magnetic stirring using a microwave Discover Explorer (CEM Corporation, USA). Six CEM glass-tubes containing around 25 g of dispersion/emulsion were heated for each condition tested (see Table 1). After cooling down to room temperature, pictures of the heated samples were taken to observe the macroscopic structure of the heated samples.

Samples were then sheared at 11,000 rpm for 1 min in CEM tubes using an Ultra-Turrax T25 basic (IKA®, Switzerland) and a smaller rod (S25N-10G) following heat treatment. Finally, formulations were stored at 4° C. until the analysis on heated samples were performed.

Particle Size Distribution (PSD).

The formulations were analyzed by SLS using a MasterSizer 3000 (Malvern Instruments Ltd®, UK). The results were treated using the Mie theory, which assumes that the particles measured are perfect spheres. The samples were mixed and dispersed in the Hydro SM measuring cell until an obscuration level of 10% was obtained. The particle refractive index of sunflower oil (1.4694) and the dispersant refractive index of water (1.33) were used during analysis.

Amount of Agglomerated Proteins Determined by High Performance Liquid Chromatography (HPLC)

In order to determine the amount of agglomerated proteins of the stock solutions the heated samples, these formulations were centrifuged at 16,000 g at room temperature for 20 min using an Eppendorf® centrifuge 5418 (Vaudaux-Eppendorf AGO, Switzerland) on day D2. The soluble part was carefully withdrawn and frozen at −20° C. to be analyzed by Reverse Phase-High Performance Liquid Chromatography (RP-HPLC).

Two HPLC systems were used for this analysis. One of the HPLC systems (Agilent Technologies 1200 series) was used for whey proteins analysis and consisted of a quaternary pump (G1322A), a column temperature controller (G1316B), an auto-sampler (G1329A) with its thermoregulatory module (G1330B) and a diode array detector (G1315D). The other HPLC system (Agilent Technologies 1100-1200 series) used for plant-based proteins, consisted of a quaternary pump (G1311A), a column temperature controller (G1316A), an auto-sampler (G1329A) with its thermoregulatory module (G1330B) and a diode array detector (G1315B). The equipment was controlled by the software ChemStation for LC 3D systems. Separations were performed on a reversed-phase analytical column Jupiter 3 µm C18 300 Å 150×2.00 mm (Phenomenex, USA). A guard cartridge system SecurityGuard (Phenomenex, USA) equipped with a Widepore C18 4×2.0 mm ID cartridge (Phenomenex, USA) was used.

Samples were defrosted overnight at 4° C., and then placed in a 25° C. water-bath before being treated and homogenized. 200 µL of sample were mixed with 800 µL of buffer (Guanidine-HCl 7.5 M; Trisodium Citrate 6.25 mM; DTT 23 mM) in a 1.5 mL Eppendorf® microtube. The mix was then homogenized with a vortex and incubated in an Eppendorf® Thermomixer Compact (Vaudaux-Eppendorf AG®, Switzerland) at 60° C. for 10 min at 650 rpm.

After incubation, samples were homogenized and centrifuged at 16,000 g for 10 min at room temperature using an Eppendorf® centrifuge 5418 (Vaudaux-Eppendorf AGO, Switzerland). 50 µL of supernatants were pipetted, introduced in a UPLC Vial and then mixed with 150 µL of water.

Gradient elution was carried out with a mixture of two solvents. Solvent A consisted of 0.1% TFA in water and solvent B was 0.1% TFA in acetonitrile/water (90/10) (v/v). Separations were performed with a linear gradient from 2 to 40% B in 21 min (1.8% B·min-1), from 40 to 60% B in 45 min (0.44% B·min-1) and from 60% B to 80% B in 2 min (10% B·min-1). This was followed by an isocratic elution at 80% B during 2 min. Finally, the gradient returned linearly to the starting condition in 5 min, followed by a re-equilibration of the column for 10 min at the initial conditions.

The flow rate was 0.25 mL/min, the column temperature was settled at 40±0.8° C. and the autosampler was kept at 8° C. The acquisition was achieved at $\lambda$=214 nm, resolution 4 nm, peak width >0.10 min (2.0 s response time) (2.5 Hz). 100 µL were injected for the plant protein samples and 50 µL for the whey protein sample. The draw speed and the eject speed were settled at 100 µL/min. The draw position was set at 0.4 mm.

Each chromatogram was manually integrated. Since not all of the species presents in plant protein isolates were known, all the peaks were considered. The Areas Under Curve (AUC) were normalized with the accurate masses and injected volumes. The duplicate values were averaged, and the standard deviation was calculated from the two points.

Morphology by Confocal Light Scanning Microscopy (CLSM) CLSM was used to investigate the morphology of the agglomerated particles on day 1. Heated samples were labelled with dyes. The microstructural analysis of the heated samples was performed using a LSM 710 confocal laser scanning microscope upgraded with an Airyscan detector (Carl Zeiss, Oberkochen, Germany).

Lipids were fluorescently labelled by adding 10 µL of 2.5% (w/v) Nile Red (Sigma-Aldrich, Saint Louis, Mo., USA) in ethanol into 1 mL of dispersion/emulsion. Nile Red is an excellent dye for the detection of intracellular lipid droplets by fluorescence microscopy (Greenspan, Mayer, & Fowler, 1985), it is highly hydrophobic and fluorescent. Imaging of the lipids was performed at an excitation wavelength of 561 nm and an emission wavelength of 570-620 nm (band-pass filter).

Proteins were fluorescently labelled by adding 10 µL of 1% (w/v) Fast Green FCF (Sigma-Aldrich, Saint Louis, Mo., USA) into 1 mL of dispersion/emulsion. Fast Green is an organic dye, electrostatically attracted to charged groups on proteins. It can bind non-covalently to the biopolymer of interest by electrostatic interactions. Imaging of the proteins was performed at an excitation wavelength of 633 nm and an emission wavelength of 645 nm (long-pass filter)

The fluorescently labelled samples (≈300 μL) were placed inside a 1 mm deep plastic chamber closed by a glass slide coverslip to prevent compression and drying artefacts. Acquisition and treatment of the images were done using the Zen 2.1 software (Carl Zeiss, Oberkochen, Germany).

Flow Behaviour

Flow curve measurements were performed on D2 on heat-treated formulations using a controlled stress rheometer Physica MCR501 (Anton Paar®, Austria). An aliquot of the samples (25 mL) was poured into the cup and analyzed with a concentric grooved cylinders geometry CC27-T200-SS/S (diameter=28.920 mm, gap=1.0846 mm by Anton Paar®, Austria) and a Peltier C-PTD200-SN81217328.

Steady state flow measurements were carried out at 25° C. Samples firstly underwent pre-shearing at a shear rate of 100 s-1 over 5 min, followed by two shearing steps, one going from 0.1 to 100 $s^{-1}$ and another from 100 to 0.1 $s^{-1}$ shear rate. A series of 15 measurements were performed for each step, with a 60 sec delay between each measurement. The apparent viscosity was recorded as a function of the shear rate using the Rheoplus software (Anton Paar®, Austria). Measurements were performed two times and the average of the two replicates was reported. In order to make direct comparisons among the different formulations, apparent viscosity at a constant shear rate of 13.9 $s^{-1}$ was recorded. This shear rate is close to that occurring in the mouth.

Results

Figure 3:
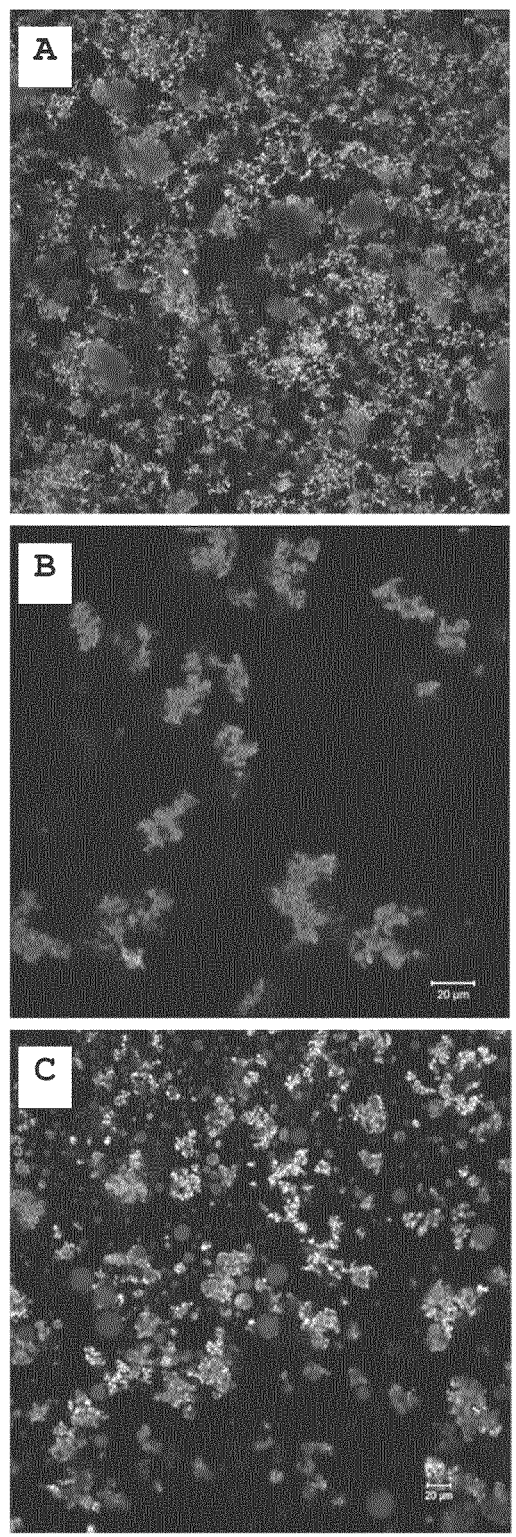
FIG. 3 shows confocal scanning laser micrographs of 3 wt % protein stabilized 2.5 wt % high oleic sunflower emulsion after heat treatment and shearing at 95° C. for 90 s at pH 6.0 in presence of 0.95 wt % NaCl and 0.1 wt % $CaCl_2$. (A) Potato protein emulsion; (B) Soy protein emulsion; (C) Pea protein emulsion. Scale bar is 20 microns.

In can be seen in table 2 that the conditions used for the 3 protein sources were leading to high agglomeration yield >65%. However, for soy and potato, the particles which were formed were too large, leading to precipitation upon storage. The only stable system was obtained with pea protein, with a particle diameter for the textured emulsion of 40 microns. The size and morphology of the agglomerated particles can be seen on FIG. 3 that is presenting the CSLM pictures of the agglomerates after heating and shearing. For potato and soy (FIGS. 3A and B), large particles were obtained while smaller and individualized ones were seen for the pea protein-based system (FIG. 3C).

TABLE 2

Agglomerated proteins, size and viscosity of texturized 2.5 wt % emulsions stabilized by 3 wt % protein after shearing at 11,000 rpm after heat at 95° C. for 90 s at pH 6.6 in presence of 0.95 wt % NaCl and 0.1 wt % $CaCl_2$.

| Protein source | Amount of agglomerated protein (% of total) | D(4,3) diameter (micron) | Viscosity at 10 $s^{-1}$ for 2.5 wt % emulsion (mPa · s) |
|---|---|---|---|
| Soy | 68 | 79 | 16.3 |
| Pea | 78.8 | 39.5 | 2.8 |
| Potato | 86.2 | 102 | 36 |

These results confirm the finding from example 1, showing that the pH conditions to texturized the emulsion while maintain an acceptable particle size should be adapted to the protein source.

Example 3: Production of a Liquid and Powder Texturized Food Emulsion Based on Potato Protein Agglomerated at Pilot Plant The system containing potato protein from example 2 has been produced at pilot scale to test the sensitivity of our invention to industrial conditions. However, in order to meet optimum pH conditions for potato protein isolate, the pH was set to 6.2, the NaCl to 0.25 wt % and the $CaCl_2$ to 0.1 wt %.

The potato protein isolate used was similar to example 2, i.e. Solanic® 200 purchased from Solanic® (The Netherlands).

Preparation of Potato Samples

Potato protein dispersions at 3 wt % protein content were prepared in demineralised water. A batch of 80 kg of potato protein isolate was prepared by dispersing under mechanical stirring for 30 min 2.9 kg of protein powder in 68.9 kg in demineralised water at 20° C. in a stainless steel tank. A quantity of 0.210 kg of NaCl and 0.09 kg of $CaCl_2,2H_2O$ was then added and stirring was continued for additional 30 min. The pH of the dispersion was then adjusted to 6.2 by addition of 52 g of 1M NaOH. To that dispersion, 4.4 kg of high oleic sunflower oil was added under strong mechanical stirring using a Ystral X50/10 mixer set at 50% speed. After 10 min, this pre-emulsion was pumped at 130 $l·h^{-1}$ and homogenized at 250/50 bars using an APV HTST pasteurisation line. The obtained emulsion was then heat treated at a flow rate of 100 $l·h^{-1}$ using the same APV HTST applying a pre-heating at 65° C. in a plate-plate heat exchanger and then a holding time of 90 s at 95° C. by steam injection in a tubular heat exchanger. The heat-treated emulsion was then cooled down to 10° C. while being shearing continuously using an IKA Ultraturrax operating at 5,500 rpm. In order to spray dry the obtained texturized protein emulsion, maltodextrin (DE21, Roquette Frères, Lestrem, France) powder was added to the emulsion under stirring to bring the total solids to 25 wt %. The composition was then heat treated at 85° C. for 15 s using and OMVE UHT HTST line operating at 45 L·h-1 before being spray dried using a NIRO MINOR spray drier operating at a flow rate of 1.5 $L·h^{-1}$ (80 $m^3·h^{-1}$ air flow at 160° C. in and 85° C. out). The final texturized potato protein emulsion powder was stored in aluminium bags.

Particle Size Distribution

The particle size distribution of the samples were determined as described in example 1. The D(4,3) mean average diameter has been reported for the different samples.

Flow Properties

The flow curves of the samples have been determined as described in example 1. The shear viscosity at 13 $s^{-1}$ has been reported for the samples.

Results

Figure 4:
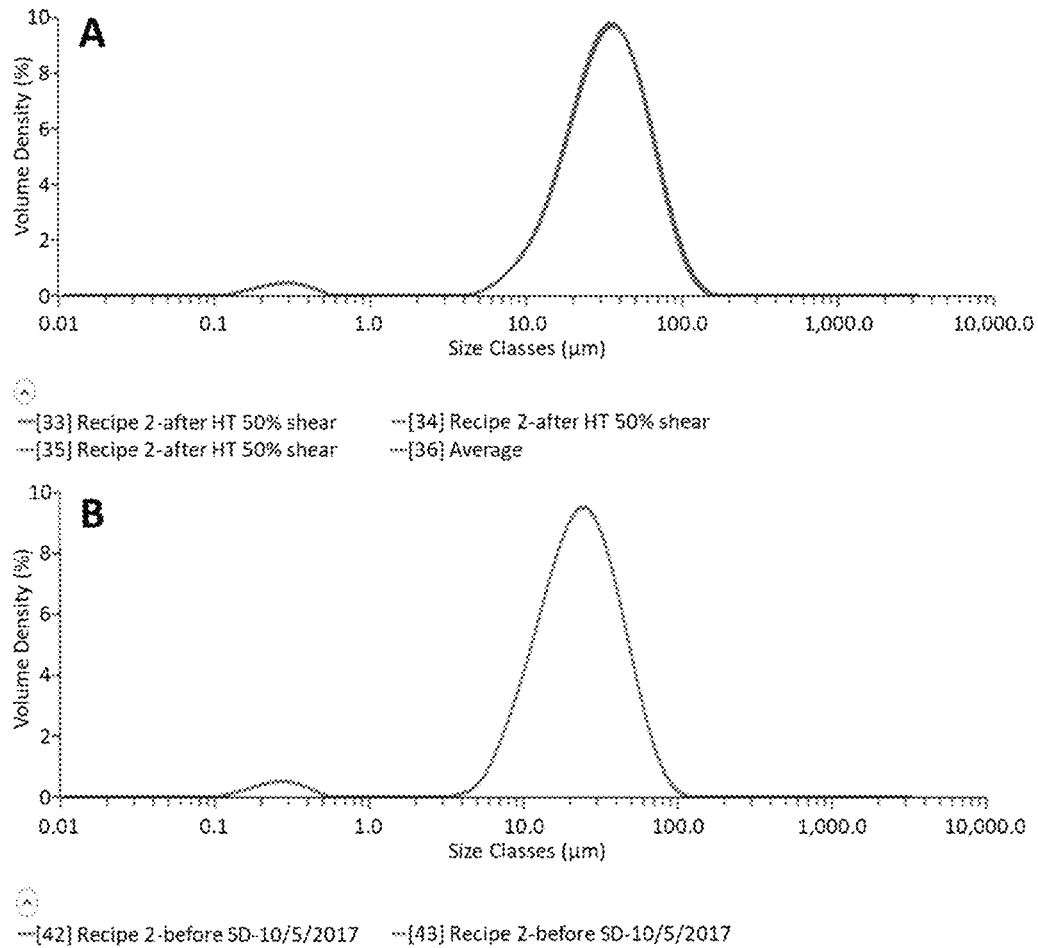
FIG. 4 shows particle size distributions of texturized 5 wt % high oleic sunflower based emulsions stabilized by commercial potato protein isolate at a total protein content of 3 wt % and after heating (95° C., 90 s) at pH 6.2 and shearing at 5,500 rpm in presence of 0.25 wt % NaCl and 0.1 wt % $CaCl_2$ at pilot scale. (A) After heat treatment and shearing; (B) After maltodextrin addition and pasteurization.

FIG. 4A shows the particle size distribution of the heat treated texturized potato protein emulsion. The D(4,3) was found to be 36.8 microns and the flow viscosity at a shear rate of 13 $s^{-1}$ was 62.3 mPa·s. After maltodextrin addition and pasteurisation, the particle size distribution of the composition is shown on FIG. 4B. It can be seen that the distribution remained monodispersed, with a D(4,3) of 25.8 microns. The emulsion powder was reconstituted MilliQ water to 13 wt % under gentle stirring at room temperature. The corresponding D(4,3) was 49 microns and the flow viscosity 2.7 mPa·s. The reconstituted powder was stable against sedimentation and creaming in the absence of stabilizing hydrocolloids and was perceived as a smooth and creamy product upon informal tasting by an internal panel.

Example 4: Production of Plant Protein-Based Emulsions

Figure 5:
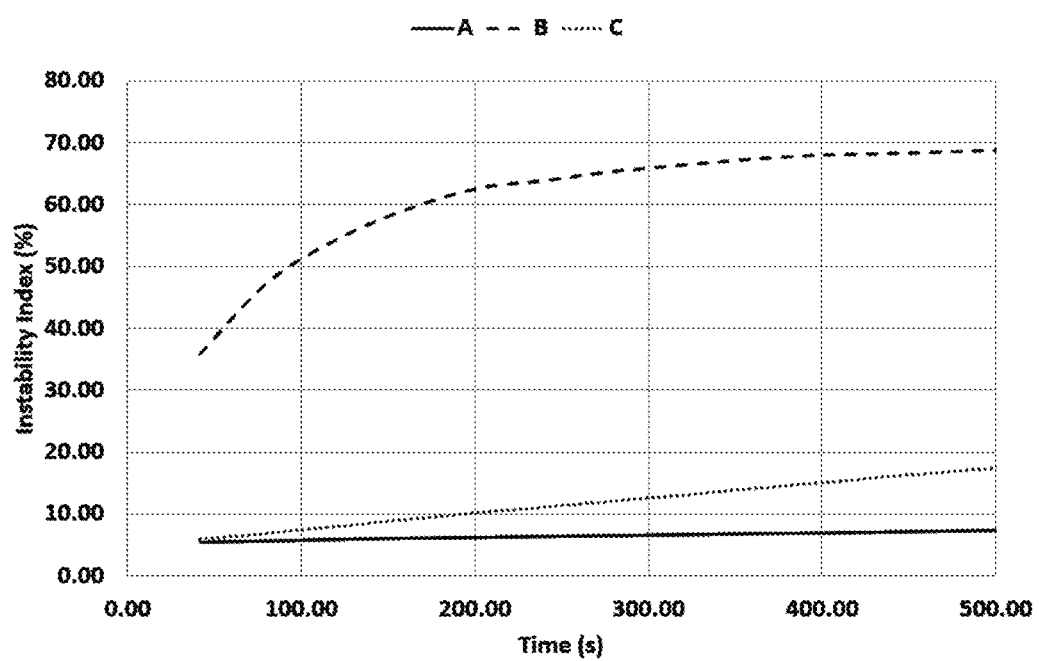
FIG. 5 shows the Instability Index of the plant protein-based emulsions (A, B, and C representing Examples 4, 5, and 6 respectively).

An amount of 2.5 kg of pea protein isolate (Nutralys 85SF, Roquette Frères, Lestrem, France) was added to 95 kg of water (~8° C.) under high agitation. Next, and after 5 minutes of mixing under continuous high agitation, 2.5 kg of palm olein were added into the tank under high agitation for 5 minutes. The plant protein-based emulsion was homogenized at 200/50 bars, acidified at pH 6.4 using lactic acid 80%, pre-heated, UHT treated for 10 seconds at 138° C., and cooled. The plant protein-based emulsion was aseptically filled into bottles and stored at 4° C. The physico-chemical stability of the plant protein-based emulsion showed no phase separation (creaming, de-oiling, marbling, etc.) or gelation during storage and excellent stability overtime. The Instability Index is shown in FIG. 5A and the Particle Size Distribution in FIG. 6A.

Example 5

A plant protein-based emulsion was prepared as in Example 4 but was acidified at pH 5.8 using lactic acid 80%. The physico-chemical stability of the plant protein-based emulsion showed phase separation (creaming, de-oiling, marbling, etc.), gelation (protein agglomeration) during storage and poor stability overtime. The Instability Index is shown in FIG. 5B and the Particle Size Distribution in FIG. 6B.

Example 6

Figure 6:
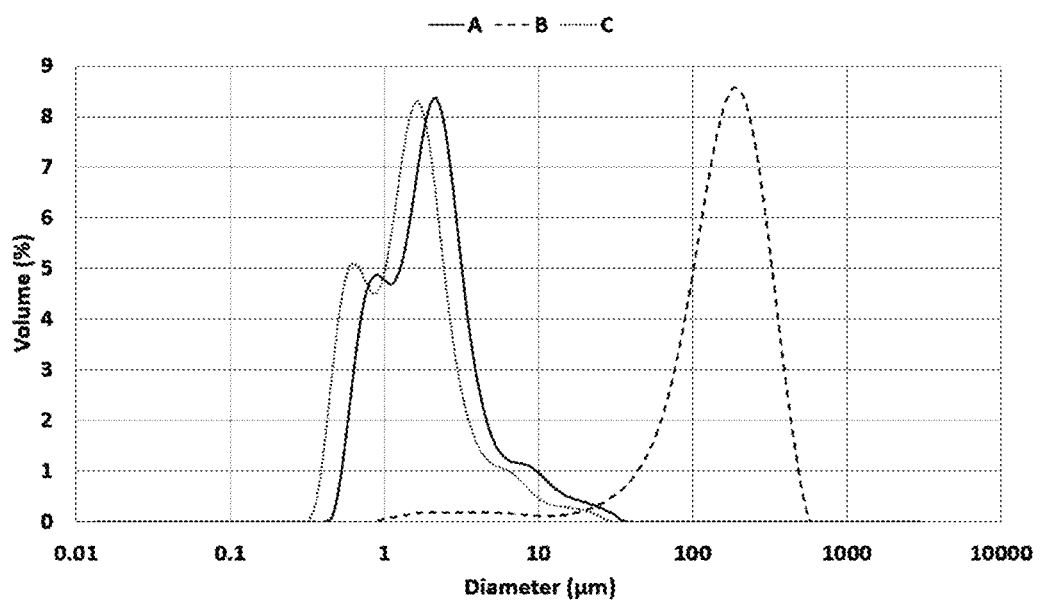
FIG. 6 represents the Particle Size Distribution of the plant protein-based emulsions (A, B. and C representing Examples 4, 5, and 6 respectively).

A plant protein-based emulsion was prepared as in Example but with no addition of acid (pH 7.4). The physico-chemical stability of the plant protein-based emulsion showed phase separation (creaming, de-oiling, marbling, etc.), gelation (protein agglomeration) during storage and poor stability overtime. The Instability Index is shown in FIG. 6C and the Particle Size Distribution in FIG. 6C.

These examples are showing the optimum pH to produce a texturized pea emulsion is 6.4 and that below or above this pH, unstable products are obtained.

Example 7

Plant protein-based RTD beverages were produced as below. A dry blend of sugar, high acyl gellan gum, plant proteins protein was prepared by mixing together 5.6 kg of sucrose with 0.1 kg of high acyl gellan, 1.14 kg of yellow pea protein produced by isoelectric precipitation of yellow pea flour, and 0.4 kg of brown rice protein. The dry blend was added to 75 kg of hot water (~75° C.) under high agitation.

Next, and after 5 minutes of mixing under continuous high agitation, 1.3 kg of palm olein were added into the tank under high agitation for 5 minutes. Additional water was added to adjust the total amount to 100 kg. The plant protein-based RTD beverage was homogenized at 200/50, acidified at pH 6.4 using lactic acid 80%, pre-heated, UHT treated for 10 seconds at 138° C., and cooled.

The plant protein-based RTD beverage was aseptically filled into bottles and stored at 4° C.

The physico-chemical stability and sensory of the plant protein-based RTD beverage were judged by trained panelists. The plant protein-based RTD beverage showed no phase separation (creaming, de-oiling, marbling, etc.) or gelation during storage and excellent stability overtime.

Figure 7:
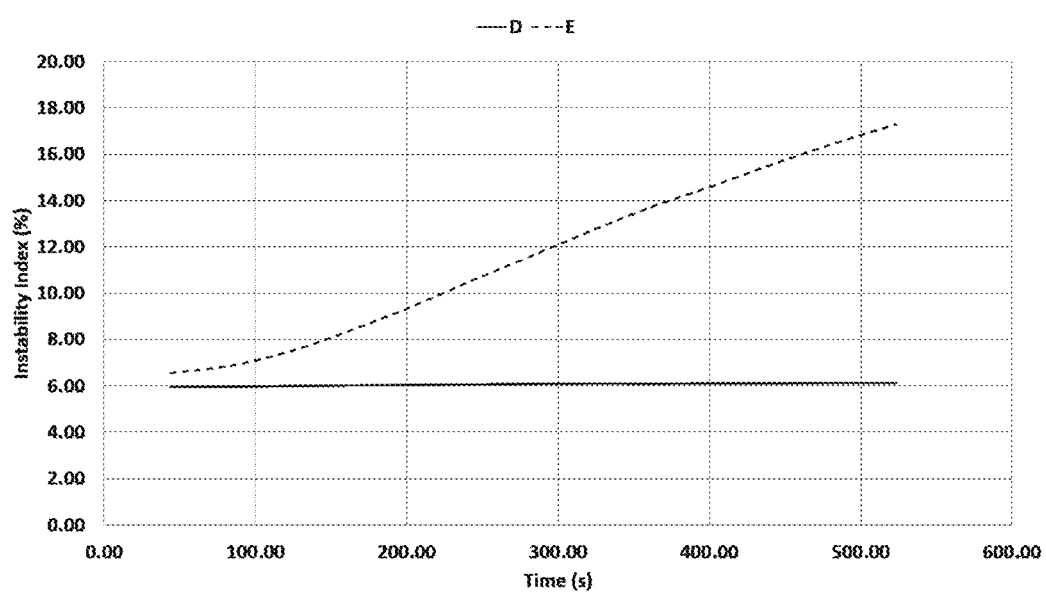
FIG. 7 shows the Instability Index of the plant-based RTD beverage with pea and rice proteins (D and E representing Examples 7 and 8 respectively).

It was surprisingly found that the plant protein-based RTD beverage has good mouthfeel, smooth texture, and a good flavor. The Instability Index after 3 months of storage at 4° C. is shown in FIG. 7D.

Example 8

A plant protein-based RTD beverage was prepared as in Example 7 but with no addition of acid (pH 7.4). The physico-chemical stability of the plant protein-based emulsion showed phase separation (creaming, de-oiling, marbling, etc.), and poor stability overtime. The sensory evaluation revealed poor body/mouthfeel. The Instability Index after 3 months of storage at 4° C. is shown if FIG. 7E.

Example 9: Production of Cocoa and Malt Plant Protein-Based RTD

A dry blend of sugar, high acyl gellan gum, plant proteins protein, and flavors was prepared by mixing together 3.6 kg of sucrose with 0.1 kg of high acyl gellan, 2.6 kg of yellow pea protein produced by isoelectric precipitation of yellow pea flour, and 0.87 kg of brown rice protein. The dry blend was added to 65 kg of hot water (~75° C.) under high agitation.

Subsequently, and after 5 minutes of mixing under continuous high agitation, 1.3 kg of palm olein were added into the tank under high agitation.

Further subsequently, and after 5 minutes of mixing under continuous high agitation, 20.0 kg of cocoa and malt slurry were added into the tank under high agitation for 5 minutes. Additional water was added to adjust the total amount to 100 kg.

The cocoa and malt plant protein-based RTD beverage was homogenized at 200/50, acidified at pH 6.4 using lactic acid 80%, pre-heated, UHT treated for 10 seconds at 138° C., and cooled. The cocoa and malt plant protein-based RTD beverage was aseptically filled into bottles and stored at 4° C.

The physico-chemical stability and sensory of the cocoa and malt plant protein-based RTD beverage were judged by trained panelists. The cocoa and malt plant protein-based RTD beverage showed no phase separation (creaming, de-oiling, marbling, etc.) or gelation during storage and excellent stability overtime.

Figure 8:
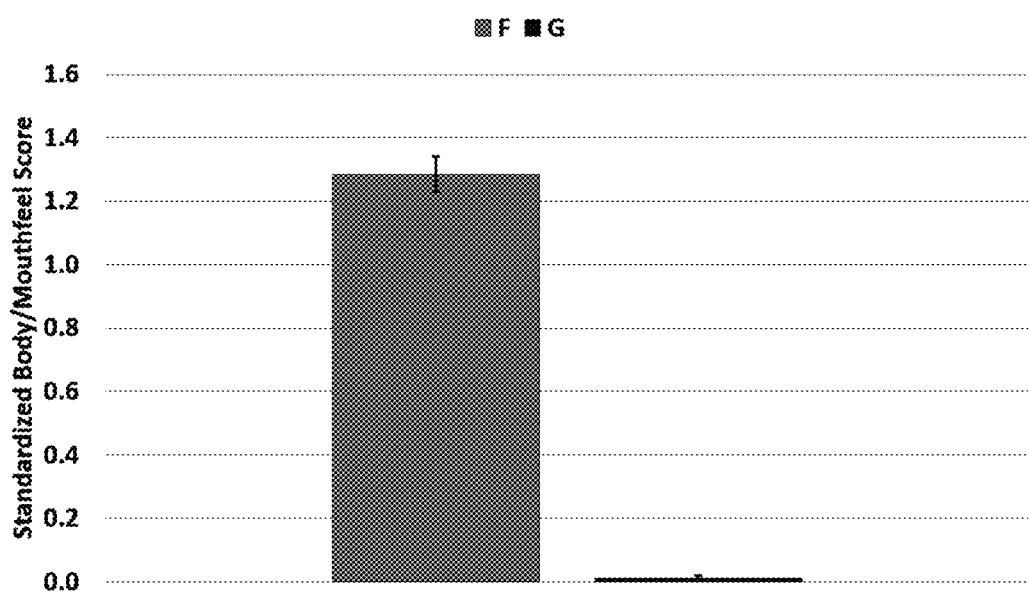
FIG. 8 shows the Standardized Body/Mouthfeel Score of the cocoa and malt plant-based RTD beverage with pea and rice proteins (F and G representing Examples 9 and 10 respectively).

It was surprisingly found that the cocoa and malt plant protein-based RTD beverage has good mouthfeel, smooth texture, and a good flavour. The Standardized Body/Mouthfeel Score is shown in FIG. 8F.

Example 10

A cocoa and malt plant protein-based RTD beverage was prepared as in Example 9 but with no addition of acid (pH 7.4). The physico-chemical stability of the plant protein-based emulsion showed phase separation (creaming, de-oiling, marbling, etc.), and poor stability overtime. The sensory evaluation revealed poor body/mouthfeel. Standardized Body/Mouthfeel Score is shown in FIG. 8G.

Example 11: Preparation of an Almond-Based RTD

A dry blend of sugar, high acyl gellan gum, guar gum, plant proteins protein, and flavours was prepared by mixing together 4.6 kg of sucrose with 0.09 kg of high acyl gellan, 0.13 kg of guar gum, 1.8 kg of yellow pea protein produced by isoelectric precipitation of yellow pea flour, and 0.58 kg of brown rice protein. The dry blend was added to 80 kg of water (~25° C.) under high agitation.

Subsequently, and after 5 minutes of mixing under continuous high agitation, 2.0 kg of almond butter were added into the tank under high agitation. Additional water was added to adjust the total amount to 100 kg.

The mix was acidified at pH 6.4 using lactic acid 80%, homogenized at 200/50, pre-heated, UHT treated for 10 seconds at 138° C., and cooled. The almond-based RTD beverage was aseptically filled into bottles and stored at 4° C.

The physico-chemical stability and sensory of the almond-based RTD beverage were judged by trained panelists. The almond-based RTD beverage showed no phase separation (creaming, de-oiling, marbling, etc.) or gelation during storage and excellent stability overtime.

Figure 9:
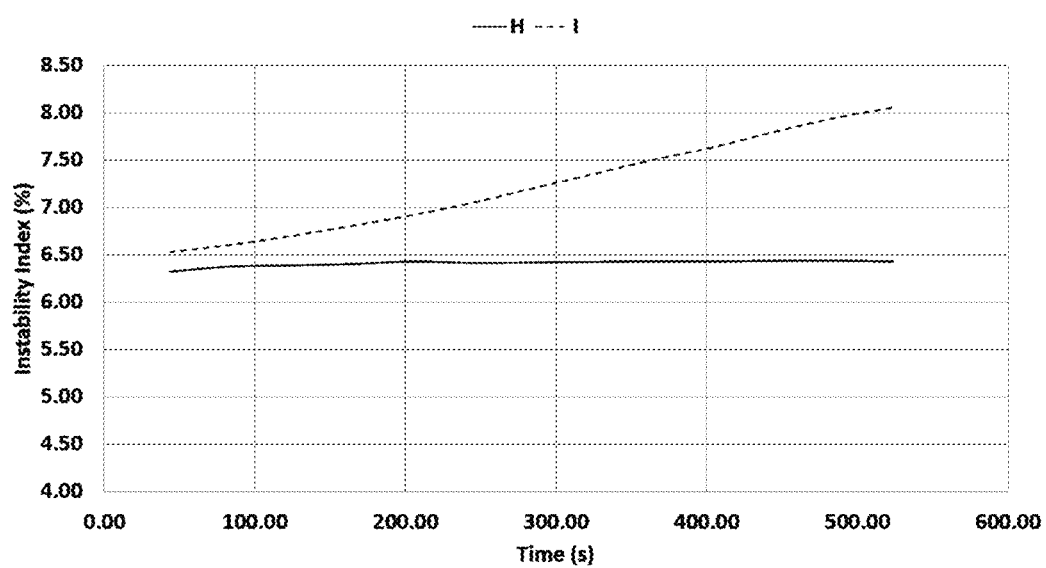
FIG. 9 shows the Instability Index of the almond-based RTD beverage with pea and rice proteins after 6 months at 4° C. (H and I representing Examples 11 and 12 respectively).
Figure 10:
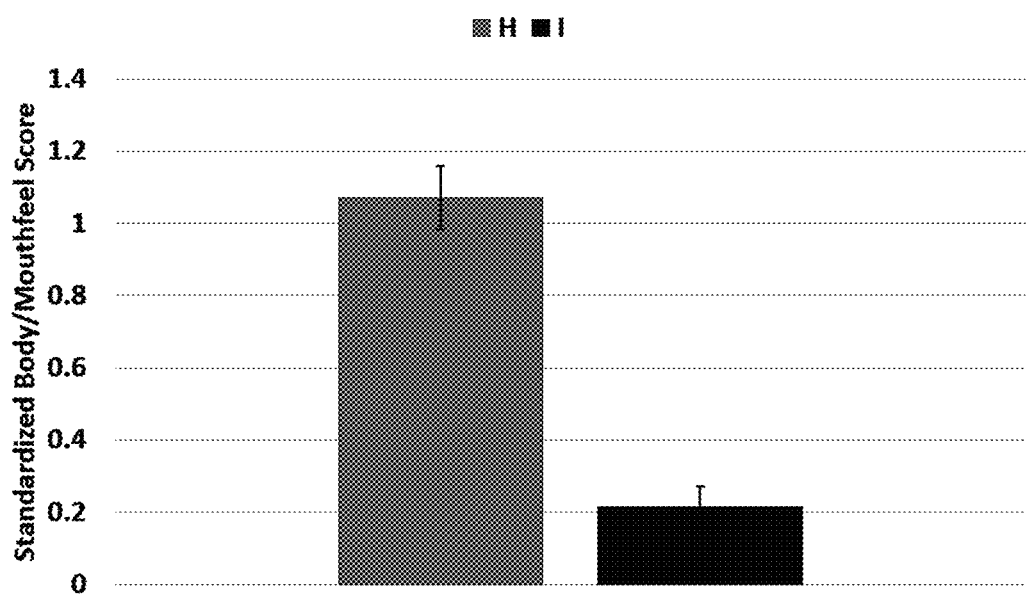
FIG. 10 shows the Standardized Body/Mouthfeel Score of the almond-based RTD beverage with pea and rice proteins after 6 months at 4° C. (H and I representing Examples 11 and 12 respectively).

It was surprisingly found that the almond-based RTD beverage has good mouthfeel, smooth texture, and a good flavour. The Instability Index is shown if FIG. 9H and the Standardized Body/Mouthfeel Score is shown in FIG. 10H.

Example 12

An almond-based RTD beverage was prepared as in Example 11 but with no addition of acid (pH 7.4). The physico-chemical stability of the plant protein-based emulsion showed phase separation (creaming, de-oiling, marbling, etc.), and poor stability overtime. The Instability Index is shown if FIG. 9I and the Standardized Body/Mouthfeel Score is shown in FIG. 10I.

Example 13

An almond-based RTD beverage was prepared as in Example 11 but with 1.8 kg of yellow pea protein extracted by air classification of yellow pea flour. The almond-based RTD beverage showed no phase separation (creaming, de-oiling, marbling, etc.) or gelation during storage and excellent stability overtime. The almond-based RTD beverage has good mouthfeel, smooth texture, and a good flavour.

Example 14

An almond-based RTD beverage was prepared as in Example 11 but with 1.8 kg of yellow pea protein extracted from the enzymatic hydrolysis of yellow pea starches from yellow pea flour. The almond-based RTD beverage showed no phase separation (creaming, de-oiling, marbling, etc.) or gelation during storage and excellent stability overtime. The almond-based RTD beverage has good mouthfeel, smooth texture, and a good flavour.

Example 15

An almond-based RTD beverage was prepared as in Example 11. The mix was acidified at pH 6.4 using lactic acid 80%, pre-heated, UHT treated for 10 seconds at 138° C., homogenized at 200/50, and cooled. The almond-based RTD beverage was aseptically filled into bottles and stored at 4° C. The almond-based RTD beverage showed no phase separation (creaming, de-oiling, marbling, etc.) or gelation during storage and excellent stability overtime. The almond-based RTD beverage has good mouthfeel, smooth texture, and a good flavour.

It should be understood that there are various changes and modifications to the presently preferred embodiments described herein which will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of producing a plant-based oil-in-water emulsion comprising the steps of:

providing an ingredient composition for the plant-based oil-in-water emulsion, wherein the ingredient composition is free from dairy protein, the ingredient composition comprising protein and oil, wherein the protein in the ingredient composition is 1.5 to 5 wt. % of the ingredient composition and consists of plant protein only, and wherein the oil in the ingredient composition is 0.5 to 10.5 wt % of the ingredient composition, and has a pH of 5.3-6.7;

heat treating the ingredient composition to a temperature of 80°-100° C. for a period of 0.5-15 min or an ultra high temperature (UHT) heat treatment above 135° C. for 3 to 30 s to form agglomerates comprising the protein and the oil; and shearing the ingredient composition during or after the heat treatment to reduce the size of the agglomerates, thereby resulting in the plant-based oil-in-water emulsion, wherein the agglomerates have a size of 5 to 50 microns as measured by D(4,3) mean diameter as measured by laser diffraction after the shearing.

2. The method according to claim 1, wherein the shearing is performed until the ingredient composition has a viscosity at 10 s-1 and 20° C. of 1-900 mPa·s.

3. The method according to claim 1, wherein the shearing of the agglomerates is performed by a rotor/stator shearing.

4. The method according to claim 1, wherein the shearing of the agglomerates is performed by a high pressure homogenizer.

5. The method according to claim 1, wherein the plant protein in the ingredient composition is selected from the group consisting of leguminous proteins, tuber proteins, oil seed proteins, cereal proteins and green leaves proteins.

6. The method according to claim 1, further comprising:
adding divalent cations to the ingredient composition until a concentration of the divalent cations is 3.5-5 mM of the ingredient composition.

7. The method according to claim 6, wherein the divalent cations are selected from the group consisting of Ca and Mg cations and combinations thereof.

8. The method according to claim 1, further comprising:
adding an acid to the ingredient composition, wherein the acid is selected form the group consisting of: vegetable lactic acid, glucono-delta-lactone, phosphoric acid, ascorbic acid, acetic acid, citric acid, malic acid, hydrochloric acid, and combinations thereof.

9. The method according to claim 1, wherein the plant protein is leguminous proteins selected from the group consisting of yellow pea, green pea, faba bean, soybean, lupin, lentil, and combinations thereof.

10. The method according to claim 9, further comprising:
treating the leguminous protein with a technique selected from the group consisting of: extracted using isoelectric precipitation, enzymatic processes, air classification, and combinations thereof.

11. The method according to claim 1, wherein the plant protein is cereal in the form of a powder.

12. The method according to claim 11, wherein the cereal comprises at least one of: rice, brown rice, rice bran, corn, wheat, oat, and combinations thereof.

13. The method according to claim 1, wherein the plant protein is an edible nut in the form of a paste or a powder.

14. The plant-based oil-in-water emulsion obtained by a method according to claim 1.

15. A method of producing a composition selected from the group consisting of: ready-to-drink (RTD) beverages, culinary sauces, coffee mixes, tea creamers, ice cream or cocoa-malt beverages, the method comprising adding a plant-based oil-in-water emulsion according to claim 14 to another ingredient of the composition.

\* \* \* \* \*